United States Patent [19]

Ma

[11] 3,961,141

[45] June 1, 1976

[54] STOP TIME-OUT UNTIL AFTER FIRST DTMF DIGIT DIALED CIRCUIT

[75] Inventor: Raymond Ma, Seattle, Wash.

[73] Assignee: Tel-Tone Corporation, Kirkland, Wash.

[22] Filed: Dec. 19, 1974

[21] Appl. No.: 534,195

[52] U.S. Cl. .................. 179/16 EC; 179/84 VF
[51] Int. Cl.² ............................ H04Q 1/50
[58] Field of Search .......... 179/16 EC, 84 VF, 90 K

[56] References Cited
UNITED STATES PATENTS

| | | | |
|---|---|---|---|
| 3,376,391 | 4/1968 | Finkhauser et al. | 179/16 EC |
| 3,430,002 | 2/1969 | Roscoe | 179/16 EC |
| 3,573,663 | 4/1971 | Huge et al. | 179/84 VF |

OTHER PUBLICATIONS

H. P. Anderson, "Touch–Tone Converter for Step-–By–Step PBX's," Bell Laboratories Record, Sept. 1965, pp. 333–336.

*Primary Examiner*—Kathleen H. Claffy
*Assistant Examiner*—Randall P. Myers
*Attorney, Agent, or Firm*—Christensen, O'Connor, Garrison & Havelka

[57] ABSTRACT

A circuit for preventing the automatic operation of the time-out portion of a tone-to-pulse converter until after the first DTMF digit is dialed is disclosed. When a calling party goes OFF HOOK, the forward loop current flowing in the tip and ring in leads is sensed. The sensed current creates a binary zero signal that sets a latch circuit. The latch circuit inhibits the automatic operation of the time-out portion of the tone-to-pulse converter until the latch circuit is reset. The latch circuit is normally reset by the first output of the tone-to-pulse converter adapted to create a rotary dial-type pulse. Alternatively, going ON HOOK without creating a DTMF digit resets the latch circuit, as does the occurrence of a rotary dial pulse on the tip and ring in leads.

8 Claims, 1 Drawing Figure

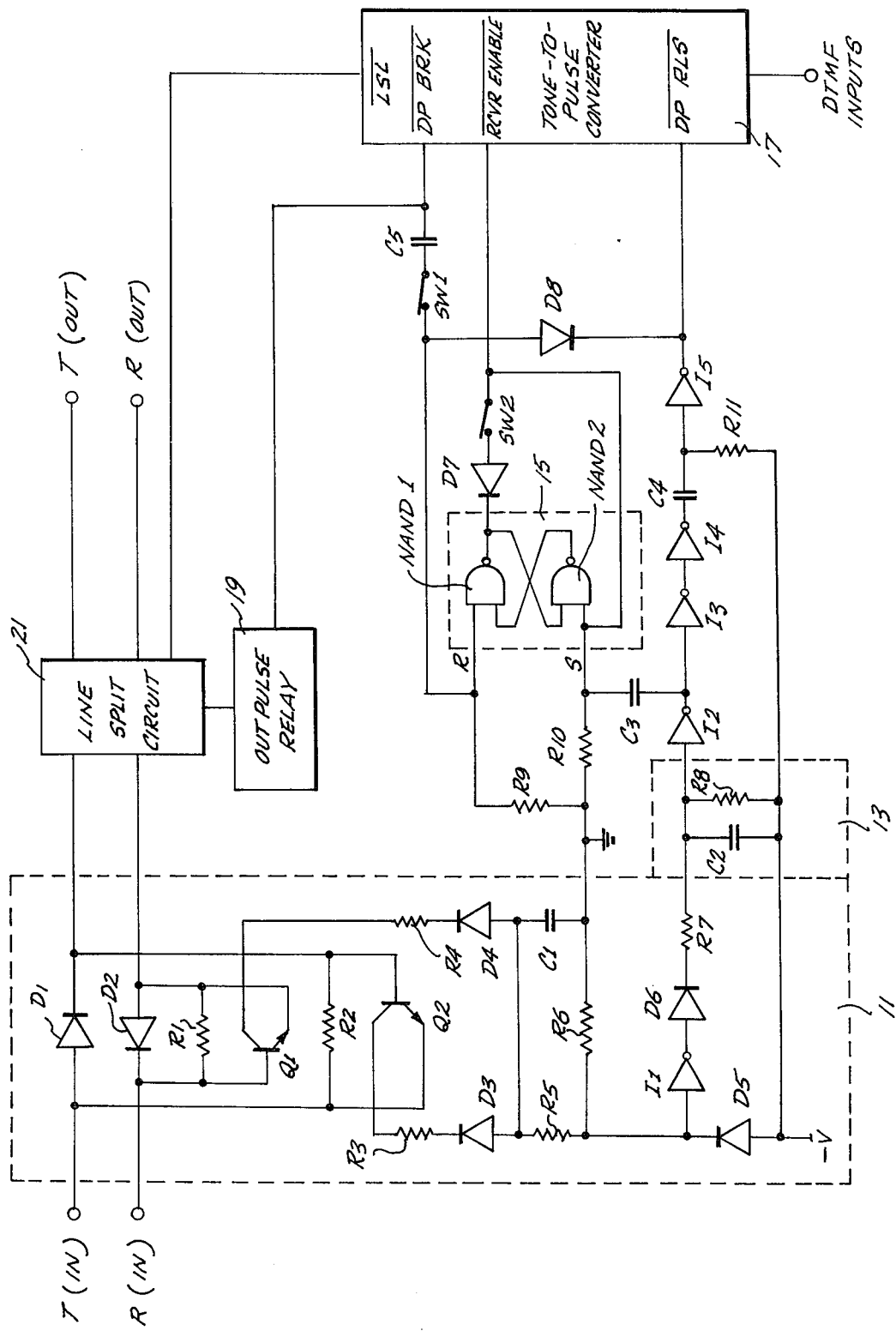

STOP TIME-OUT UNTIL AFTER FIRST DTMF DIGIT DIALED CIRCUIT

BACKGROUND OF THE INVENTION

This invention is directed to telephone systems and, more particularly, to tone-to-pulse converters suitable for converting the DTMF (Dual Tone Multi Frequency) signals generated by push-button-type telephones into rotary dial-type pulses.

Tone-to-pulse converters for converting DTMF signals of the type generated by push-button telephones into rotary dial-type pulses are well known and widely used. These devices are required in telephone systems that include switching systems that are only operable by rotary dial-type pulses, not by DTMF signals.

Tone-to-pulse converters of this nature fall into two general categories. In one category are allotter systems wherein a plurality of tone-to-pulse converters are assigned in an allotted manner to a plurality of tip and ring telephone lines on an as-needed basis. In the second category are dedicated tone-to-pulse converters. In a dedicated system, a tone-to-pulse converter is "hard wired" to a single set of tip and ring leads. An example of a dedicated tone-to-pulse converter is the model M-161 tone-to-pulse converter produced by the Tel-Tone Corporation, Kirkland, Wash. the assignee of the present application. The present invention is particularly suitable for use with a dedicated tone-to-pulse converter.

Tone-to-pulse conversion systems, in general, regardless of whether or not they are of the allotter variety or of the dedicated variety are adapted to receive DTMF signals of the type generated by push-button telephones. The signals are stored and used to create sequential series of rotary dial-type pulses, each series equal in number to the number of a related push-button. More specifically, when a push-button is depressed, it causes a unique combination of high and low frequency tones (one of each type) to be generated. A tone-to-pulse converter receives these tones and tests them to determine whether or not one-and-only-one high frequency tone and one-and-only-one low frequency tone exists. Assuming this test, and other tone time tests are passed, a related binary signal is stored and used to create a series of rotary dial-type pulses that are applied to the output tip and ring leads, after the telephone line has been split. These pulses are recognized by downstream switching systems and utilized to create the desired telephone interconnection.

In many tone-to-pulse conversion systems, a time-out circuit is included. The time-out circuit specifies the maximum time period that can occur: (1) between the time the subscriber goes OFF HOOK and depresses the first button; and, (2) between button depressions (interdigit time periods). If the maximum time period elapses before these actions take place, the system is automatically reset and the subscriber must go ON HOOK and OFF HOOK before he can successfully dial. While the time-out circuit is usually included to disable the tone-to-pulse converter subsequent to an entire series of digits being "dialed," it is normally enabled when the subscriber initially goes OFF HOOK. Thus, in the past, if the subscriber did not dial the first digit within the time-out circuit's time period, the tone-to-pulse converter was automatically disabled from the circuit and he could not thereafter dial effectively without first going ON HOOK and then OFF HOOK. This disablement has created a problem in the past because while the converter was disabled, the dial tone was still being heard by the subscriber. More specifically, many telephone switching systems, such as step-by-step switching systems, do not include a time-out circuit that disables the dial tone some predetermined period after a telephone goes OFF HOOK, if a subscriber does not dial. In other words these systems generate a dial tone as long as a telephone is OFF HOOK, until a first digit is dialed. Thus, the subscriber is not informed by a lack of dial tone that the converter is disabled and he can no longer "dial" a desired telephone number. This invention is primarily directed to eliminating this problem of prior art tone-to-pulse conversion systems, particularly those of a dedicated nature.

Therefore, it is an object of this invention to provide an apparatus for preventing the time-out portion of a tone-to-pulse conversion system from operating until a first DTMF digit is dialed.

It is another object of this invention to provide an inexpensive electronic circuit that prevents a dedicated tone-to-pulse converter from automatically being inhibited by the automatic operation of a time-out circuit until after a first DTMF signal has been received by the tone-to-pulse converter.

It is a still further object of this invention to provide a tone-to-pulse converter with stop time-out until after first DTMF digit dialed circuit that prevents the tone-to-pulse converter from being disabled until a first DTMF signal has been received and used to initiate the out pulsing of a related series of rotary dial-type pulses.

SUMMARY OF THE INVENTION

In accordance with principles of this invention, a stop time-out until after first DTMF digit dialed circuit is provided for use in combination with a tone-to-pulse converter. The circuit senses when a calling party goes OFF HOOK. When this action occurs, the forward loop current flowing in the tip and ring input leads is sensed and used to create a suitable binary signal. The binary signal sets a latch circuit that inhibits the operation of the time-out portion of the tone-to-pulse converter until the latch circuit is reset. The latch circuit is normally reset by the first output of the tone-to-pulse converter adapted to create a rotary dialtype pulse. Alternatively, goin ON HOOK without creating a DTMF digit resets the latch circuit, as does the occurrence of a rotary dial pulse on the tip and ring leads.

In accordance with further principles of this invention, the latch circuit is formed of a pair of cross-coupled NAND gates. In addition, control switches are included. One control switch allows the user of the invention to inhibit its operation, i.e., place it in a state such that it will not prevent the automatic operation of the time-out portion of the tone-to-pulse converter under any set of conditions. A second control switch prevents the normal resetting of the latch circuit whereby the automatic operation of the time-out portion of the tone-to-pulse converter is inhibited during all interdigit time periods.

In accordance with still other principles of this invention, preferably, an ON HOOK delay circuit is provided. The ON HOOK delay circuit prevents an ON HOOK action from resetting the latch circuit until a minimum period of time has elapsed, for example 150 milliseconds (ms). It will be appreciated from the foregoing summary that the invention provides an uncomplicated electronic circuit having various modes of operation. Its primary mode of operation is to stop time-out until after the first DTMF digit is dialed by the subscriber's telephone. In addition, it has other modes of operation, which allow it to be flexibly combined with a tone-to-pulse converter, particularly a dedicated tone-to-pulse converter.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawing that illustrates a preferred embodiment of the invention.

DESCRIPTION OF THE PREFERRED EMBODIMENT

The single FIGURE illustrates a preferred embodiment of the invention and comprises: a current sensing circuit 11; an ON HOOK time delay circuit 13; a latch circuit 15; a tone-to-pulse converter 17; an out-pulse relay 19; and, a line split circuit 21. The figure also illustrates two single pole-single throw control switches designated SW1 and SW2, and a plurality of connecting components hereinafter described. The further illustrated tip and ring input terminals, T(IN) and R(IN), are to provide a connection to the subscriber's telephone and the tip and ring output terminals, T(OUT) and R(OUT), are to provide a connection to downstream telephone switching circuitry.

The tone-to-pulse converter 17 may take on a variety of forms. Since the invention was developed for use in combination with the model M-161 tone-to-pulse converter produced by the Tel-Tone Corporation, Kirkland, Wash., it will be described in combination with such a tone-to-pulse converter; however, it will be appreciated that it can also be used with other types of tone-to-pulse converters. Among other inputs and outputs, a tone-to-pulse converter receives DTMF signals at input terminals designated DTMF inputs. The DTMF inputs are obtained by connecting T(IN) and R(IN) to a filter system (not shown). The filter system, preferably, includes a plurality of parallel filters, each adapted to pass one of the high, or one of the low, tones generated by a DTMF telephone when its buttons are depressed.

As will be readily appreciated by those skilled in the art, when two tones, one high and one low, are generated by the depression of a push-button, exist for a predetermined time period, and pass through their associated filters, they create binary signals that are stored in the tone-to-pulse converter. Thereafter, the binary signals are sequentially read out and used to create a series of pulses. The pulses occur at an output terminal, designated $\overline{DP\ BRK}$, connected to the out-pulse relay 19. In accordance with the series of digits it receives, the out-pulse relay generates a series of rotary dial-type pulses.

In addition, a tone-to-pulse converter output, designated $\overline{LSL}$, is connected to the line split circuit 21. $\overline{LSL}$ achieves an appropriate state when the first DTMF signal is recognized and passes the tests set up by the tone-to-pulse converter. When this state is achieved, the line split circuit splits the lines between T(IN) and R(IN), and T(OUT) and R(OUT), respectively. More specifically, when $\overline{LSL}$ achieves a particular state, determined by the fact that the tone-to-pulse converter has received a suitable pair of tones for a predetermined period of time, the line split circuit 21 splits the line between T(IN) and R(IN), and T(OUT) and R(OUT). First, the line split circuit applies a suitable voltage to the T(IN) and R(IN) terminals. This voltage is adapted to provide a substitute source for the oscillators of the DTMF telephone to prevent them from becoming deactivated when the line is split. After the substitute voltage source is so connected, the line is split and T(OUT) and R(OUT) are connected to the out-pulse relay 19. The rotary dial-type pulses created by the out-pulse relay are thus applied to downstream telephone switching mechanisms via T(OUT) and R(OUT).

In addition to its DTMF inputs, and $\overline{LSL}$ and $\overline{DP\ BRK}$ outputs, the only other terminals of the tone-to-pulse converter 17 of significance to the present invention are inputs designated $\overline{RCVR\ ENABLE}$ and $\overline{DP\ RLS}$. The $\overline{RCVR\ ENABLE}$ input, when it receives an appropriate pulse, enables the tone-to-pulse converter including its time-out circuit. More specifically, prior to the present invention, current flow through the tip and ring leads caused by the subscriber's telephone going OFF HOOK placed an enabling pulse on the $\overline{RCVR\ ENABLE}$ input of the tone-to-pulse converter causing its time-out circuit to be enabled. After a predetermined time period, if a DTMF digit was not received, the time-out circuit disabled the tone-to-pulse converter by applying an internally generated pulse to $\overline{DP\ RLS}$ causing the action described below. The present invention prevents this action from occurring, usually until a first DTMF digit is dialed.

$\overline{DP\ RLS}$ is also adapted to release the tone-to-pulse converter when a rotary dial pulse is sensed at T(IN) and R(IN) or when a subscriber goes ON HOOK. More specifically, in some cases, several telephones are connected to a single converter via line finders and first selectors. Some of these telephones may be rotary dial telephones and others may be DTMF telephones. If a rotary dial telephone seizes the line, obviously, tone-to-pulse conversion is not needed. Consequently, it is desirable that the converter be released and, thus, the line split circuit be prevented from splitting the line. An appropriate binary $\overline{DP\ RLS}$ input performs this action.

The foregoing description has generally described the operation of a tone-to-pulse converter, the following description describes the nature and operation of the invention in combination with such a tone-to-pulse converter.

The current sensing circuit 11 comprises: six diodes designated D1–D6; seven resistors designated R1–R7; a capacitor designated C1; two NPN transistors designated Q1 and Q2; and, an inverter designated I1.

T(IN) is connected to the anode of D1. THe cathode of D1 is connected to the line split circuit 21. R(IN) is connected to the cathode of D2. The anode of D2 is connected to the line split circuit 21. R1 is connected in parallel with D2, and R2 is connected in parallel with D1. The cathode of D2 is connected to the base of Q1 and the anode of D2 is connected to the emitter of Q1. The cathode of D1 is connected to the base of Q2 and the anode of D2 is connected to the emitter of Q2.

The collector of Q1 is connected through R4 to the cathode of D4. The collector of Q2 is connected through R3 to the cathode of D3. The anodes of D3 and D4 are connected together. In addition, the anode of D3 is connected through R5 in series with R6 to ground. The anode of D4 is connected through C1 to ground. The junction between R5 and R6 is connected to the cathode of D5. The anode of D5 is connected to a suitable voltage source designated −V. The cathode of D5 is connected through I1 to the anode of D6. The cathode of D6 is connected to one end of R7.

In operation, forward loop current from T(IN) to R(IN) caused by the subscriber's telephone going OFF HOOK creates a current flow through R1 and R2 that activates Q1 and Q2. This activation causes the cathode of D5 to be connected to −V, creating a binary zero on the input of I1. Since I1 inverts its input, a one is applied through D6 to R7. Consequently, when the subscriber's telephone goes OFF HOOK, a binary one occurs at the other end of R7, which forms the output of the current sensing circuit.

The ON HOOK delay circuit 13 comprises a capacitor designated C2 and a resistor designated R8. C2 and R8 are connected in parallel, one end of the parallel combination being connected to the other end of R7. The other end of the parallel combination is connected to −V. The ON HOOK delay circuit provides a time delay, determined by the value of C2 and R8, between the subscriber going ON HOOK and the recognition of the ON HOOK state by other circuitry hereinafter described. Preferably, this time delay is of the order of 150 ms.

The latch circuit 15 is preferably formed of two cross coupled NAND gates, designated NAND 1 and NAND 2. The NAND gates, as will be readily appreciated by those skilled in the art, are set or reset by one to zero transitions on the related set (S) and reset (R) inputs of the latch. The S input is connected to the second input of NAND 2 and the R input is connected to the second input of NAND 1.

A coupling circuit formed of an inverter designated I2 and a capacitor designated C3 connects the ON HOOK delay circuit 13 to the S-input of the latch circuit 15. More specifically, the other end of R7 of the current sensing circuit 11 is connected through I2 in series with C3 to the S input of the latch circuit 15. In addition, the S-input is connected through R10 to ground. The R-input is connected through R9 to ground.

The junction between C3 and I2 is also connected through a coupling circuit formed of: three inverters designated I3, I4 and I5; a capacitor designated C4; and a resistor designated R11, to the $\overline{DP\ RLS}$ input of the tone-to-pulse converter 17. More specifically, the output of I2 is connected through I3 in series with I4 to one end of C4. The other end of C4 is connected through I5 to the $\overline{DP\ RLS}$ input of the tone-to-pulse converter 17. R11 is connected between the junction of C4 and I5, and −V.

The output of NAND 1 is connected to the cathode of a steering diode designated D7. The anode of D7 is connected through SW2 to the $\overline{RCVR\ ENABLE}$ input of the tone-to-pulse converter 17. The $\overline{RCVR\ ENABLE}$ input of the tone-to-pulse converter 17 is also connected to the S input of the latch circuit 15. The R-input of the latch circuit 15 is further connected to the anode of a steering diode designated D8, and through SW1 connected in parallel with an isolating capacitor designated C5 to the $\overline{DP\ BRK}$ ouput of the tone-to-pulse converter 17. The cathode of D8 is connected to the $\overline{DP\ RLS}$ input of the tone-to-pulse converter 17.

Turning first to a description of the normal operation of the start time-out until after first DTMF digit dialed circuit illustrated in the FIGURE; in normal operation SW1 and SW2 are closed. As previously described, when the subscriber goes OFF HOOK a binary one occurs on R7. This binary one creates a one-to-zero transition on the output of I2. This one-to-zero transition is AC coupled through C3 to the set input of the latch circuit 15, causing it to be set or latched. This same latch set pulse is also applied to $\overline{RCVR\ ENABLE}$ of the tone-to-pulse converter to enable it, including its time-out circuit.

The binary zero that exists on the output of NAND 1 when the latch circuit 15 is set forms an inhibit signal at the $\overline{RCVR\ ENABLE}$ input of the tone-to-pulse converter 17, through D7 and SW2 that prevents the tone-to-pulse converter from being disabled by its time-out circuit. Thus, the tone-to-pulse converter remains enabled as long as the latch circuit 15 remains set.

When the subscriber dials the first DTMF signal by depressing a push-button, that signal is recognized by the tone-to-pulse converter, as previously described, and stored. The received DTMF signal causes $\overline{LSL}$ to achieve the state necessary to cause the line split circuit 21 to split the line. In addition, the received signal causes a series of digits to be applied to the out-pulse relay 19. The out-pulse relay pulses, in turn, cause rotary dial-type pulses to be applied to T(OUT) and R(OUT). The first digit applied to the out-pulse relay is also applied through C5 and SW1 to the reset input of the latch circuit 15 causing it to be reset. Thereafter, the time-out circuit of the tone-to-pulse converter 17 is enabled, and acts in a conventional manner to measure the time period (interdigital) between digit dialing. The latch circuit 15 remains reset as long as the subscriber remains OFF HOOK because forward loop current continues to exist and no further one-to-zero transitions occur on the output of I2. Steering diode D8 prevents the pulse applied to the out-pulse relay 19 from being applied to the input of $\overline{DP\ RLS}$, which pulse, as previously described, would disable the tone-to-pulse converter 17, if it occurred.

It will be appreciated from the foregoing description that, when the subscriber's telephone goes OFF HOOK, the latch circuit 15 is immediately set. As previously discussed, in some cases, the subscriber's telephone may be a rotary dial telephone, whereby tone-to-pulse conversion is not needed. If this condition exists, the first rotary dial pulse sensed by the current sensor will create an output on 15 that performs two functions. First, the pulse will disable the tone-to-pulse converter 17 via input $\overline{DP\ RLS}$. In addition, the pulse will cause a one-to-zero transition (through D8) to occur on the R input of the latch circuit 15 causing it to be reset. This same action will occur even if DTMF signals have been previously recognized and stored.

If the subscriber goes ON HOOK any time after he has gone OFF HOOK, the ON HOOK delay circuit 13 will cause a reset pulse to be applied to the $\overline{DP\ RLS}$ input of the tone-to-pulse converter resetting it. The same pulse will create a zero-to-one transition on R of the latch resetting it.

Under some circumstances, it may be desirable to prevent the latch circuit 15 from ever inhibiting the time-out portion of the tone-to-pulse converter 17. If such circumstances exist, the user of the invention can readily disable the output of the latch circuit 15 by merely opening SW2. Alternatively, in some instances, it may be desirable to allow the latch circuit 15 to remain set through the entire conversion sequence, i.e., the entire dialing sequence. If so, SW1 cn be opened (SW2 closed) to prevent any $\overline{DP\ BRK}$ output pulses from resetting the latch circuit 15.

It will thus be appreciated from the foregoing description that the invention overcomes the difficulty of prior art devices wherein the tone-to-pulse converter became disabled when a subscriber did not depress his first DTMF signal within a prescribed period of time after going OFF HOOK. The invention achieves this result using uncomplicated, but reliable, electronic circuitry.

While a preferred embodiment of the invention has been illustrated and described, it will be appreciated that various changes can be made therein without departing from the spirit and scope of the invention. For example, latches, other than one formed by cross coupled NAND gates, can be utilized, if desired. Hence, the invention can be practiced otherwise than as specifically described herein.

The embodiments of the invention in which an exclusive property or privilege is claimed are defined as follows:

1. A stop time-out until after first DTMF digit dialed circuit for a telephone tone-to-pulse converter that includes a time-out circuit that is normally enabled when said tone-to-pulse converter is enabled, said stop time-out until after first DTMF digit dialed circuit comprising:
  a current sensing circuit for detecting when a telephone connected to said sensing circuit goes OFF HOOK;
  a latch circuit connected to said current sensing circuit in a manner such that said latch circuit is set when said current sensing circuit senses that a subscriber has gone OFF HOOK;
  connecting means for connecting said latch circuit to a tone-to-pulse converter in a manner such that said latch circuit prevents the time-out circuit of said tone-to-pulse converter from disabling the operation of said tone-to-pulse converter when said latch circuit is set; and,
  primary resetting means for resetting said latch circuit, said primary resetting means being connected between the pulse output of said tone-to-pulse converter and the reset input of said latch circuit in a manner such that said latch circuit is reset when said tone-to-pulse converter generates an output pulse.

2. A stop time-out until after first DTMF digit dialed circuit as claimed in claim 1 wherein said latch circuit is formed of a pair of cross coupled NAND gates.

3. A stop time-out until after first DTMF digit dialed circuit as claimed in claim 2 including a secondary resetting means coupling said current sensing circuit to the reset input of said latch circuit in a manner such that said latch circuit is reset when a telephone connected to said current sensing circuit goes ON HOOK after going OFF HOOK.

4. In a tone-to-pulse conversion system comprising a tone-to-pulse converter, including a time-out circuit, for converting DTMF pulses of the type generated by push-button telephones into rotary dial-type pulses adapted to be out pulsed via tip and ring telephone lines after the tip and ring telephone lines are split, the improvement comprising a stop time-out until after first DTMF digit dialed circuit connected to said tone-to-pulse converter so as to inhibit the operation of the time-out circuit of said tone-to-pulse converter until a first DTMF digit is dialed by an associated telephone to which said tone-to-pulse converter is connected.

5. The improvement claimed in claim 4 wherein said time-out until after first DTMF digit dialed circuit includes a latch circuit that is set when the associated telephone goes OFF HOOK, said latch circuit being connected so as to be reset when said tone-to-pulse converter generates its first out-pulse related to the first DTMF digit received.

6. The improvement claimed in claim 5 including a secondary reset means for resetting said latch circuit when the associated telephone goes ON HOOK after previously going OFF HOOK.

7. A tone-to-pulse conversion system comprising:
  A. a tone-to-pulse converter including a time-out circuit adapted to disable tone-to-pulse conversion if a predetermined time period elapses after (a) an associated telephone goes OFF HOOK without a subscriber depressing a push-button of said associated telephone or (b) the depression of one push-button without the depression of a subsequent push-button of said associated telephone, said time-out circuit being normally enabled when said associated telephone goes OFF HOOK; and,
  B. a stop time-out until after first DTMF digit dialed circuit including:
    1. a sensing means for sensing when said associated telephone goes OFF HOOK:
    2. an inhibiting means for inhibiting the time-out circuit of the tone-to-pulse converter from disabling tone-to-pulse conversion until a first DTMF digit is received and started to be out-pulsed; and,
    3. a reset means connected between the output of said tone-to-pulse converter and said inhibiting means for terminating the operation of said inhibiting means when the first DTMF digit received is started to be out-pulsed.

8. A tone-to-pulse conversion system as claimed in claim 7 wherein said inhibiting means includes a latch circuit and said sensing means includes a current sensor, said current sensor connected to said associated telephone when said associated telephone goes OFF HOOK so as to generate a suitable binary signal in accordance therewith, said latch circuit being connected to said current sensor so as to be latched when said current sensor generates said suitable binary signal, an output of said latch circuit being connected to said tone-to-pulse converter so as to prevent the operation of the time-out portion of said tone-to-pulse converter when said latch circuit is set, said reset means being connected to the reset input of said latch circuit so as to reset said latch circuit when said tone-to-pulse converter starts to out-pulse pulses related to the first DTMF digit received.

* * * * *